United States Patent [19]

Keen

[11] 4,086,946
[45] May 2, 1978

[54] LOCKING NUT

[75] Inventor: Ralph Otto Keen, Roseville, Mich.

[73] Assignee: Taper Line, Incorporated, Roseville, Mich.

[21] Appl. No.: 684,348

[22] Filed: May 7, 1976

[51] Int. Cl.² ............................................. F16B 39/04
[52] U.S. Cl. .................................................. 151/21 C
[58] Field of Search .................. 151/21 C, 21 R, 23, 151/21 B, 31; 85/8.9, 8.6, 7, 8.8

[56] References Cited

U.S. PATENT DOCUMENTS

| 1,183,190 | 5/1916 | Hansell | 151/21 C |
| 2,381,110 | 8/1945 | Chandler | 151/21 R |
| 2,550,511 | 4/1951 | Williams | 151/23 X |
| 2,580,745 | 1/1952 | Engstrom | 151/21 B |
| 2,641,345 | 6/1953 | Dunkelow | 151/21 C X |

FOREIGN PATENT DOCUMENTS

| 871,405 | 6/1961 | United Kingdom | 151/21 C |

Primary Examiner—Ramon S. Britts
Attorney, Agent, or Firm—Remy J. VanOphem

[57] ABSTRACT

A locking nut provided with a conventional nut body having two end faces and a longitudinal threaded bore, locking means comprising at least one slot disposed in an end face of said locking nut and means for uniformly deforming the opposite walls of the slot so as to obtain a uniform deformation of the wall of the threaded bore, thereby locking and clamping the nut body upon a threaded member engaged in nut threaded bore.

11 Claims, 13 Drawing Figures

LOCKING NUT

BACKGROUND OF THE INVENTION

The present invention belongs to the field of locking nuts wherein a nut is locked upon a threaded member engaged in the nut threaded bore as a result of local deformation of a portion of the threaded bore wall, once the nut has been threaded in position on the threaded member.

The prior art is replete with lock nuts provided with a locally deformed thread or a locally deformed threaded bore resulting in a predetermined amount of interference fit between the nut thread and the thread of a male member on which the nut is threaded. Such lock nuts, sometimes called prevalent torque lock nuts, require that a substantial torque be applied to the nut for threading it upon the threaded member. In the prior art, lock nut structures are also found which comprises a deformable soft metal, or plastic, annular or longitudinal insert in the nut threaded bore, so as to provide a substantial amount of frictional interference between the nut internal thread and the external thread of the threaded member engaged in the threaded bore. Such prior art lock nut structures present the disadvantages of requiring additional torquing, sometimes of an excessive amount, for threading the nut on the threaded member, and causing substantial deformation of the threaded member. The limited amount of frictional resistance to relative motion between the nut and the threaded member achieved by such structures is substantially decreased as a result of repeated disassemblies of the elements which cause rapid wear and damages to the nut itself and to the threaded member engaged therewith. The end result is decreased locking capability as a result of torque loss due to wear of the soft metal or plastic inserts in the nut threaded bore.

Other nut locking devices are also found in the prior art, such as provided by a conventional nut and a counternut torqued in firm engagement with each other, by a tongued washer whose tongues are bent over after the nut has been torqued into position so as to engage a flat portion of the outer periphery of the nut body for immobilizing it into position, by the drilling of a cross hole through the nut body and the male threaded member and locking of the nut into position by means of a cotter pin or wire, or even by the use of permanent assemblies wherein the nut is welded or soldered to the threaded male member after torquing of the nut in position.

Other prior art nut locking means may consist of threaded bores radially disposed in the nut body, each provided with a set screw having an end driven in engagement with the threaded member periphery after the nut has been torqued into position. Such an arrangement may obviously damage the thread of the threaded member to the point that disassembly of the elements may be prevented.

Further, locking nut structures are found in the prior art, such as those disclosed in Brogren, Swedish Pat. No. 50020 or Pollard, British Pat. No. 871,405, which require a groove intersecting the threaded bore portion in order to create the locking feature. A set screw is therein used to deform the locking element so as to contact the threaded member located in the locking nut. Torquing of the set screw not only creates highly localized holding forces, but causes the locking element to act as a threading die, thereby cutting into the threaded male member when locked into position into the nut. Further, the distribution of the locking force is such that the highest concentration is at one end of the locking element where at the opposite end of the locking element there is virtually no locking force. It is because of this nonuniform distribution of locking force that these types of locking nuts tend to act as threading dies when threaded upon a male member.

Prior art such as those mentioned, as well as Berto, Norwegian Pat. No. 70883, have the disadvantages of creating highly localized locking forces thereby causing damage to the threads of the male member upon which the locking nut is threaded. Further, the nonuniform distribution of the locking force along the axis of the threaded bore results in a substantially lower holding force thereby requiring excessive deformation of the locking element which over a period of time will result in damage to the threads of the threaded male member.

SUMMARY OF THE INVENTION

The present invention avoids the inconveniences of lock nuts provided with a threaded bore having a permanently deformed wall portion or the inconveniences of lock nuts provided with a deformable insert, as a locking nut according to the present invention can be threaded into position, for assembly of elements upon a threaded member, as easily as a conventional nut, and once in position, can easily be locked in such position until disassembly is required. In a locking nut, according to the present invention, the amount of locking force is not predetermined and can be adjustably controlled to any value required. In addition, there is no risk to cause any damage to the thread of the threaded member because of the uniform distribution of the locking force along the entire axial length of the threaded bore.

The locking nut, according to the present invention, does not require any auxiliary lock nut or lock washer, is applicable to any conventional or nonconventional type of lock nut, and results in an assembly which is neat in appearance, occupies little room, does not cause any interference with tools generally used for torquing nuts into position such as wrenches and spanners, and provides a safe assembly with any amount of locking effect desired.

The present invention thus provides a locking nut which may be made of any otherwise conventional nut body and which, by uniform deformation of the wall of the nut threaded bore once the nut has been threaded into position, causes a uniform clamping and locking effect of the nut upon the threaded member with which it is engaged, and which, by generally requiring uniform deformation of the threaded bore within the elastic limit of the material of the nut body, enables the wall of the threaded bore of the nut to return to its original configuration prior to unthreading the nut from its threaded member, when dismantling of the assembly is desired. Furthermore, the locking force created by the locking nut embodiment of the present invention is uniformly distributed along the entire length of the threaded bore of the locking nut, thereby generating a substantially greater clamping and locking effect than heretofore available by conventional lock nuts.

Furthermore, the locking nut of the present invention of simple structure, easy to manufacture by conventional machining means, is substantially low in cost, neat in appearance and reusable indefinitely.

Other objects and advantages of the present invention will become apparent to those skilled in the art when the following description of the best embodiment contemplated in practicing the invention is read in conjunction with the accompanying drawings.

DETAILED DESCRIPTION OF THE PREFERRED EMBODIMENT

Figure 1:
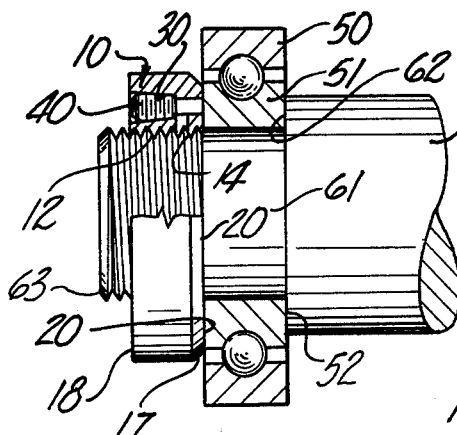
FIG. 1 is an example of the use of the locking nut of the invention for holding a bearing on a shaft.

Referring now to the drawings, and more particularly to FIG. 1, an example of a mechanical assembly utilizing the locking nut according to the present invention is shown. In the example illustrated, the nut body member 10 is used for holding a bearing 50 on the reduced diameter portion 61 of a shaft 60 in abutment against a shoulder portion 62 of the shaft between its normal diameter portion and a reduced diameter portion 61 thereof. The end of the reduced diameter portion 61 of the shaft is provided with a thread 63 on which the nut body member 10 is threaded until the face 20 of the nut body member 10 engages an annular side surface 52 of the inner raceway 51 of the bearing 50. The set screws 40 are then driven tight in threaded holes 30 provided therefor so as to cause the inner thread 12 of the nut body member 10 to tightly engage the threaded portion 63 of the shaft 60 according to the invention described below, thus holding the nut body member 10 and consquently the bearing 50 securely in position on the shaft 60. When it is desired to remove the bearing 50 from the shaft 60, the set screws 40 are backed up, and the nut body member 10 is then released such that it can, in turn, be freely unthreaded from engagement with the male threaded portion 63 of the shaft 60.

Figure 2:
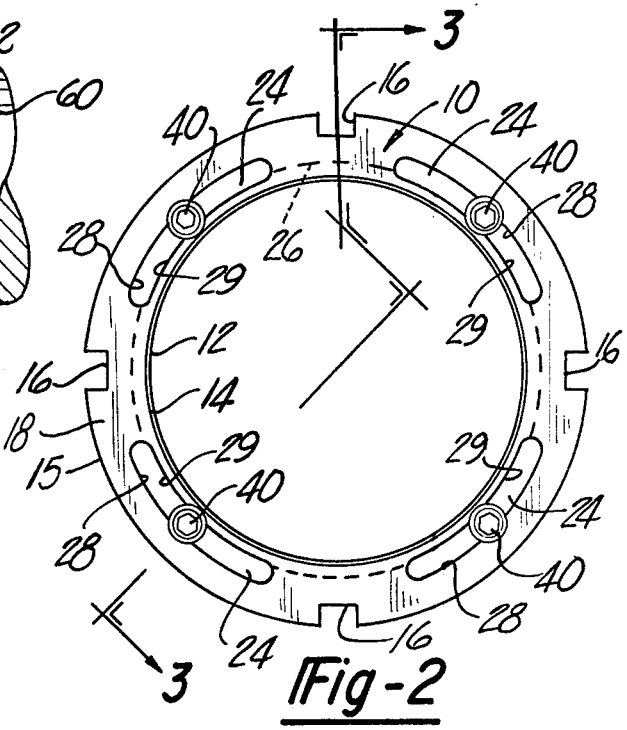
FIG. 2 is a plane view of the locking nut according to the present invention.
Figure 3:
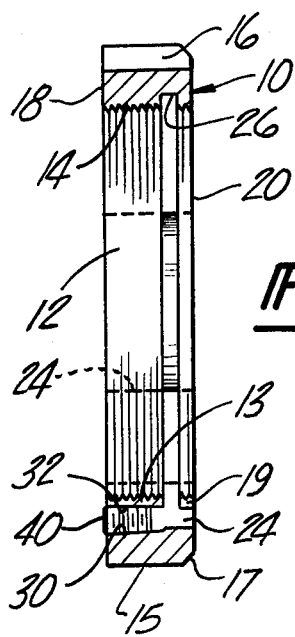
FIG. 3 is a sectional view of FIG. 2 from line 3—3.

The invention as taught by the preferred embodiment is more particularly shown in FIGS. 2 and 3. A locking nut, according to the invention, comprises a conventional nut body member 10 provided with an axial bore 12 having a thread 14. The nut body member 10 is provided with a peripheral generally cylindrical surface 15. The cylindrical surface may have notches, as shown at 16, to permit the nut body member to be driven in rotation by an appropriate spanner for tightening of the nut in a conventional manner to assemble elements in any desired mechanical assembly. It is clear that any other form of nut body member may be used such as, for example, a nut body member provided with appropriately disposed flat surfaces on its periphery to permit driving of the nut body member by means of appropriate wrenches and like driving tools.

The nut body member 10 has two opposite annular faces shown at 18 and at 20, respectively, disposed in planes substantially normal to the longitudinal axis of the nut body member 10. The tapered section 17 shown in the example of the locking nut, such that the annular face 20 has an outer diameter less than that of the annular face 20, is for illustrative purposes only. It is obvious that the configuration of the nut body member 10 is a matter of choice and design and many other shapes will be readily apparent to those skilled in the art, without departing from the scope of the invention.

According to the present invention, at least one slot, and preferably a plurality of slots, as generally shown at 24, are formed in the nut body member 10. The slots may be straight, or arcuate as illustrated, and it is contemplated that they may extend from one face 18 of the nut body member 10 through the entire thickness of the nut to the other face 20 thereof, or at least partly from one face 18 deep into the nut body member 10. It is important to note that although the slots 24 may be straight or arcuate, they may not intersect the threaded bore 12 along its axial length from face 18 to face 20 or any portion thereof. A circular groove 26 is cut on the surface of the threaded bore 12 of the nut body member 10. The circular groove 26 is preferably located at a position away from the one face 18 of the nut body member 10 so that the circular groove will intersect the slots 24 at a predetermined position at a longitudinal position corresponding approximately to the bottom of the threaded bores 30 or recesses in the slots 24.

The slots 24 shown by the preferred embodiment of the invention have two substantially parallel opposite walls, 28 and 29, respectively. Interposed said walls is a wedging means which provides for communication with each of said walls so as to cause a uniform deformation along the entire length of the threaded bore 12 of the nut body member 10. The deformation of the threaded bore 12 of the nut body member 10 causes it to assume a noncircular shape.

In the example of the locking nut illustrated, the wedging means consists of a bore or recess 30 drilled substantially at the center of the slot 24, as best shown in FIG. 3 and the bore or recess 30 is tapped with a thread 32 to accept a tapered set screw 40. After the nut body member 10 has been driven tight in position upon a threaded male member, each tapered set screw 40 is tightened in such manner that it causes the wall 29 offering the least resistance to the force generated by the set screw 40 to move away from the opposite wall 28, thus deforming the wall of the threaded internal bore 12 of the nut body member 10 to cause controlable and variable degrees of the nut thread 14 interference with the thread of the threaded male member. With closely fitted threads between the threaded male member and the thread 14 of the nut axial bore 12, only a small amount of deformation is required to lock the locking nut member 10 upon the male threaded member securely. The deformation is within the normal elastic modulus of the metal forming the nut body member 10, such that it is only necessary to back up slightly the tapered set screws 40 to permit the nut body member 10 to be released from clamping engagement with the coacting threaded male member.

With the structure of FIGS. 2 and 3, when the tapered set screws 40 are driven tight, such that the wedging action of the tapered set screws 40 cause the separation of the walls 28 and 29 as above described, the circular groove 26 allows the portion of the threaded bore 12 corresponding to that illustrated at 13, between the circular groove 26 and the face 18 of the nut body member 10 to deform uniformly and thereby create a uniform holding force along the entire length of the portion 13 heretofore described. The portion 19 between the circular groove 26 and the opposite face 20 or the other face of the nut body member 10, in the example illustrated, maintains a substantially circular shape and experiences no deformation whatsoever.

Figure 4:
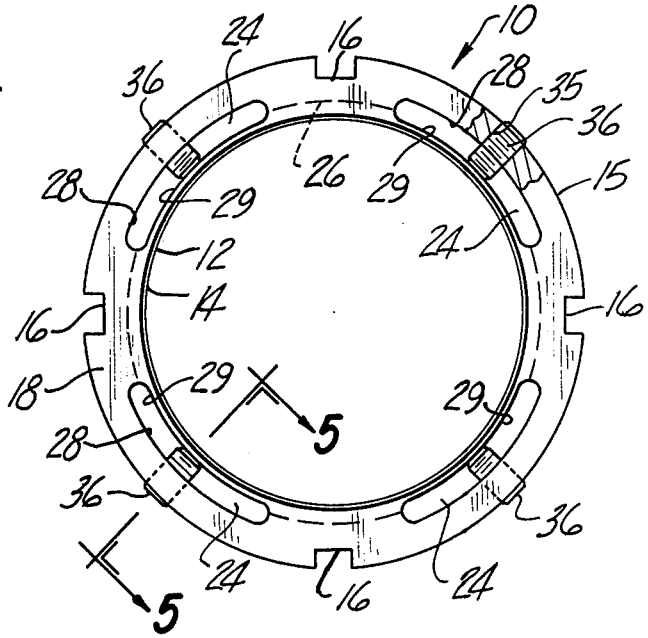
FIG. 4 is a plan view according to the present invention, but showing a modification in the locking feature.
Figure 5:
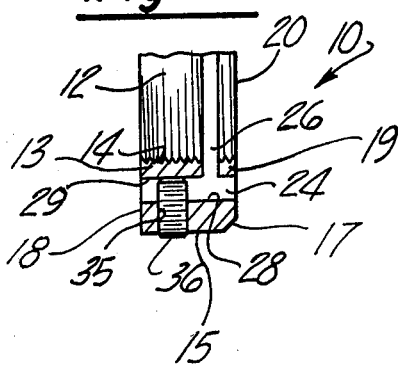
FIG. 5 is a partial sectional view of FIG. 4 from lines 5—5.
Figure 6:
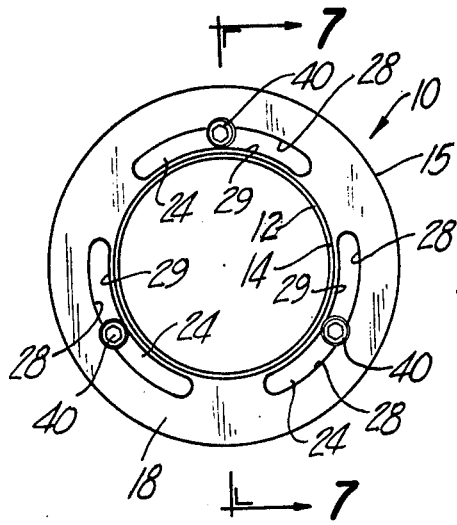
FIG. 6 is a plan view of a locking nut according to the present invention, but showing further modifications of the locking feature as utilized on smaller size locking nuts.
Figure 7:
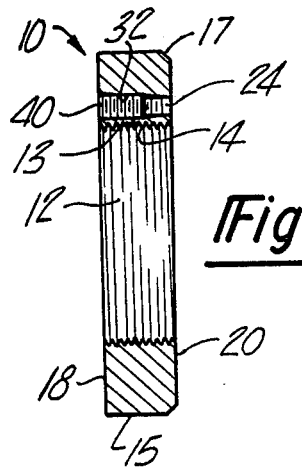
FIG. 7 is a sectional view of FIG. 6 along line 7'7.

FIGS. 4 and 5 illustrate a different embodiment of the invention whereby the wedging means to provide deformation of the walls 28, 29 of the slot is accomplished by providing a threaded bore 12 from the outer periphery 15 of said lock nut member 10 to the slot 24 in the face 18 of said member 10. The wedging means here is provided by set screws 36 that are accepted into the threaded bore 35. After the nut body member 10 has been driven tight in position upon a threaded male member, each set screw 36 is tightened in such manner that it causes the wall 29 to deform as earlier described. Also, as earlier described, the deformation of the lock nut threaded internal bore 12 is controlable and variable in degrees depending upon the amount of torque applied to the threaded set screw 36. The deformation of the internal threaded bore 12 is designed to be within the normal elastic modulus of the metal forming the nut body member 10 such that when the set screw 36 is unthreaded from the threaded hole, the internal wall 29 of the nut body member 10 is allowed to assume its original position thereby allowing the internal threaded bore 12 to assume a circular shape and permitting the lock nut 10 to be disengaged from its threaded male member.

Figure 8:
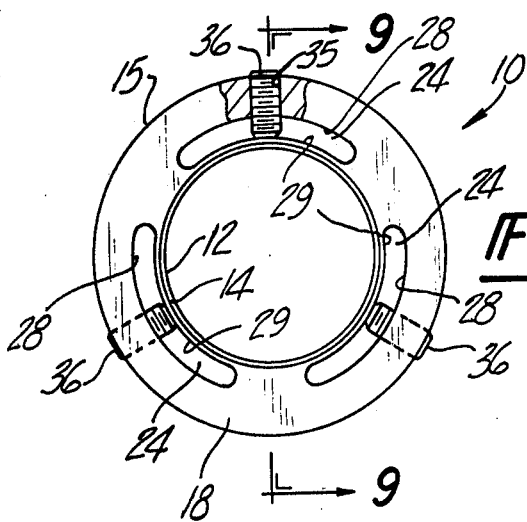
FIG. 8 is a plan view like FIG. 6 incorporating the modification of the locking feature shown in FIGS. 4 and 5.
Figure 9:
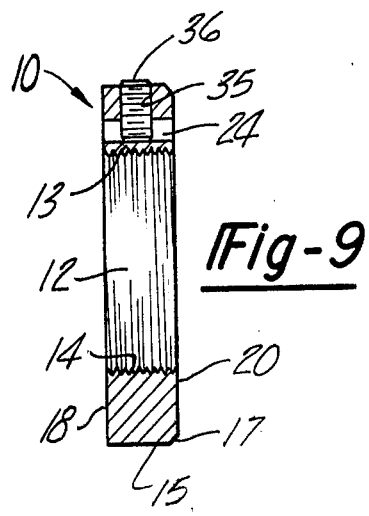
FIG. 9 is a sectional view of FIG. 8 taken along line 9—9.

FIGS. 6 through 9 are a further modification of the preferred embodiment. This modification is principally directed toward smaller lock nuts whereby the thickness of the nut is sufficiently small so that uniform deformation of the walls of the slot as earlier described is accomplished without the need of the circular groove in the internal threaded bore. FIGS. 8 and 9 specifically describe the peripheral lock method as earlier described in FIGS. 4 and 5.

Figure 10:
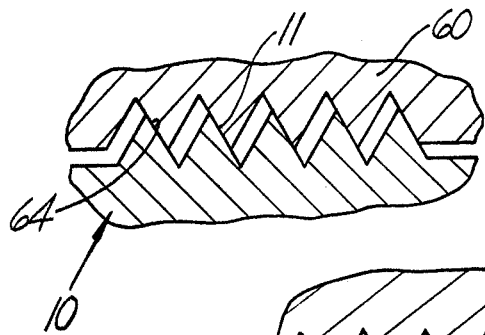
FIG. 10 is a break-away partial view showing the typical thread engagement between two threaded members in the engaged position.
Figure 11:
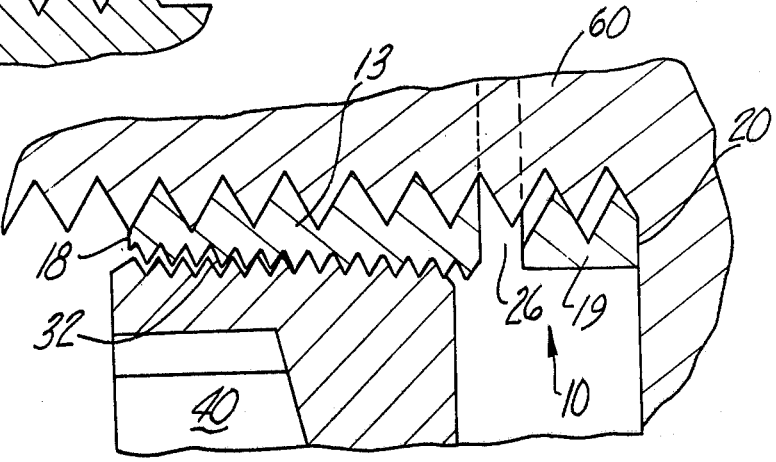
FIG. 11 is a partial sectional view of the typical thread engagement between a male threaded member and a locking nut according to the present invention after the locking nut is moved into position as that shown in FIG. 1 with the locking element shown in a working relationship.

It is apparent from the descriptions given above that the preferred embodiment of the invention exhibits the ability to provide substantially greater locking forces than the prior art because of the ability of the lock nut body member 10 (referring again to FIG. 2) to deform uniformly along its entire axial threaded bore 12 length from the face 18 to where the circular groove 26 intersects the internal threaded bore 12 as well as the slot 24. Extensive testing has shown the deformation to be uniform in character so that the threaded body member 10 locks up along the entire axial length of this axial deformation. Each and every thread between the face portion 18 of the lock nut member 10 and the circular groove 26 locks upon each and every thread of the threaded male member. This is readily apparent when viewing FIGS. 10 and 11. FIG. 10 shows the typical mating condition of a standard thread engagement between a male such as shaft 60 and female threaded member such as a lock nut 10. Generally, when a male and female threaded member are interengaged, the thread will engage along a portion of one flank 64, 11 of each of the threads. This is a result of the tolerance limitations between the thread on the male and female members. Now, when viewing FIG. 11, the preferred embodiment of the invention as heretofore described will become readily apparent. FIG. 11 shows the mating condition between a male and female member incorporating the embodiments of this invention. Note that the deformation between the face 18 of the lock body member 10 and the circular groove 26 on the internal bore 12 of the lock body member 10 causes each and every thread of the lock nut member thereinbetween to engage the male member. By locating the circular groove 26 at this predetermined position, it has been shown by extensive testing that the portion of the internal bore 12 of the lock nut member 10 between the circular groove 26 and the face 18 deforms substantially uniform. It is this uniform deformation which allows the lock nut member 10 to exhibit a substantially greater locking force than the prior art. As earlier described, nonuniform deformation along the axial length of the lock nut body member can cause highly localized forces resulting in damage to, generally, the male member as well as a substantially lower holding force.

In the examples of the invention illustrated, the slots 24 are substantially concentric with the threaded bore 12 of the nut body member 10. This provides for a symmetrical design and facilitates cutting of the slots by means of an appropriate milling cutter; the nut body member being mounted on a threaded mandril on a machine table and the milling cutter effecting a cut while the table is rotated an appropriate number of degrees. Although the example of locking nuts according to the invention has been shown provided with three or four slots, it is obvious that in some applications only one slot may be required 24, and in other configurations, especially where the nut body member 10 has a substantially large diameter 15 and when, additionally, a strong locking action is desired, more than three or four slots may be provided in the nut body member.

It is preferable to have the slots 24 disposed relatively close to the threaded bore 12 such that the metal, or other material, of the nut body member 10 between the slot and the peripheral surface 15 of the nut body member 10 has greater rigidity than the metal of the nut body member 10 between the slots 24 and the threaded bore 12. The slot threaded bores or recesses 30 are preferably formed equidistance from the ends of the slots, but they need not be centrally disposed relative to the opposite walls 28 and 29 of the slots and they may even be formed in only one of such opposite walls.

Figure 12:
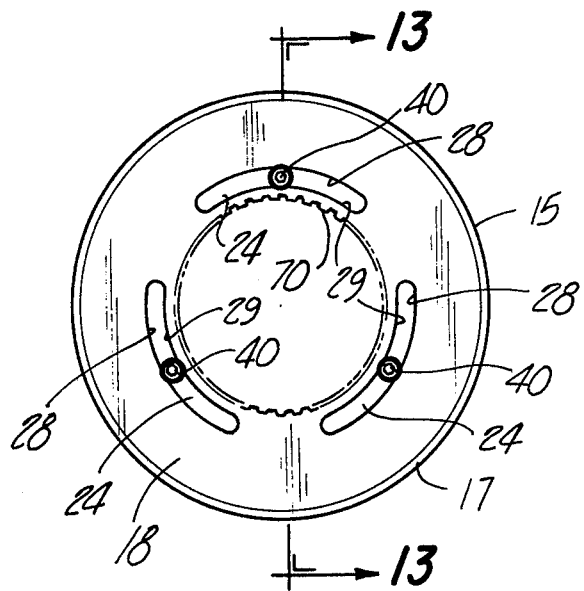
FIG. 12 is a plan view of another embodiment utilizing a splined bore.
Figure 13:
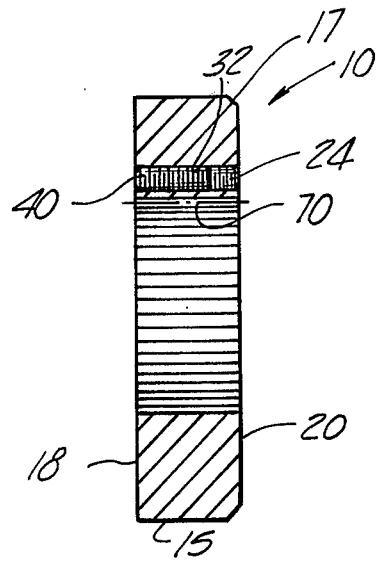
FIG. 13 is a cross section view along lines 13—13 of FIG. 12.

FIGS. 12 and 13 illustrate another embodiment of the invention. In this embodiment, a spline 70 is utilized on the bore 12 of the nut body member 10. With this configuration on the bore diameter, the invention as taught herein can be practiced on a spline shaft. The remaining referenced characters are the same as those described in FIG. 6 and 7 except for the addition of a one preceding all of the common referenced characters.

It will be readily apparent to those skilled in the art, that the locking nut of the invention may be modified by omitting the internal thread 14 to form a modified locking nut which can be fitted on an unthreaded shaft, thus providing a locking ring. Further, the locking nut of the invention may be modified by providing a splined internal bore which can be fitted on a splined shaft, thus providing a means of locking splined male and female members.

Having thus described the invention by way of illustrative examples thereof, what is sought to be protected by U.S. Letters Patent is as follows:

1. A locking nut comprising a nut body member of conventional structure having two end faces and a longitudinal bore extending from face to face, at least one slot substantially concentric with said longitudinal bore interposed said two end faces of said nut body member, said at least one slot defining a resilient segment portion of uniform circumferential width along its axial length, said resilient segment portion configured to freely deflect radially, said resilient segment portion further communicating with said nut body member proximate the ends of said at least one slot, said resilient segment portion being fixed at each end of said at least one slot and further being symmetrically deformable by said concentricity of said at least one slot and wedging means engageable with two opposite walls of said slot for communicating with said walls so as to cause a uniform deformation of said longitudinal bore, said wedging means producing a radial deflection of said resilient segment portion fixed at both ends such that the deflection of said resilient segment portion is generalized along the length thereof to increase the holding power of said nut body member.

2. The locking nut of claim 1 wherein said wedging means comprises a tapered set screw engaging a threaded recess extending partially into at least one of said opposite walls of said slot.

3. The locking nut of claim 1 further comprising a circular groove formed in said longitudinal bore, said circular groove extending radially outwards beyond at least one of said walls of said slot.

4. The locking nut of claim 1 wherein said longitudinal bore is threaded.

5. The locking nut of claim 1 wherein said longitudinal bore has a spline thereon.

6. The locking nut of claim 3 wherein said longitudinal bore is threaded and said circular groove extends radially outwards beyond one of said walls of said slot.

7. The locking nut of claim 3 wherein said circular groove is formed in said threaded bore at a longitudinal position substantially co-planer with the end of said set screw when said set screw is fully engaged n said threaded recess.

8. In combination with a locking nut having a nut body member of conventional structure with two end faces and a longitudinal bore extending from face to face, the improvement comprising:
   at least one slot substantially concentric with said longitudinal bore interposed said two end faces of said body member, said at least one slot defining a resilient segment portion of uniform circumferential width along its axial length, said resilient segment portion configured to freely deflect radially, said resilient segment portion further communicating with said nut body member proximate the ends of said at least one slot, said resilient segment portion being fixed at each end of said at least one slot, and further being symmetrically deformable by said concentricity of said at least one slot;
   wedging means interposed the two opposite walls of said slot for communicating with said walls so as to cause a uniform deformation of said longitudinal bore, said wedging means producing a radial deflection of said resilient segment portion fixed at both ends such that the deflection of said resilient segment portion is generalized along the length thereof to increase the holding power of said nut body member; and
   a circular groove formed in said longitudinal bore, said circular groove projecting into said at least one slot disposed in the face of said body member and formed in said bore at a longitudinal position substantially co-planer with the end of said wedging means when said wedging means is fully engaged between said two opposite walls of said at least one slot.

9. The locking nut of claim 8 wherein said wedging means further comprises a threaded recess extending partially into at least one of said opposite walls of said at least one slot and a tapered set screw threadable into said threaded recess.

10. The locking nut of claim 8 wherein said longitudinal bore is threaded.

11. The locking nut of claim 8 wherein said longitudinal bore is splined.

* * * * *

UNITED STATES PATENT AND TRADEMARK OFFICE
CERTIFICATE OF CORRECTION

PATENT NO. : 4,086,946
DATED : May 2, 1978
INVENTOR(S) : Ralph Otto Keen

It is certified that error appears in the above-identified patent and that said Letters Patent are hereby corrected as shown below:

Column 1, line 19, delete the word "comprises" and insert ----comprise----.

Column 2, line 3, after the words, "locking element where", please insert a comma.

Column 2, line 4, after the words, "locking element", please insert a comma.

Column 2, line 16, after the words, "element which", please insert a comma.

Column 2, line 16, after the words, "period of time", please insert a comma.

Column 3, line 19, delete "7'7" and insert ----7-7----.

Column 3, line 51, after the words, "threaded until the", please insert the word ----annular----.

UNITED STATES PATENT AND TRADEMARK OFFICE
CERTIFICATE OF CORRECTION

PATENT NO. : 4,086,946
DATED : May 2, 1978
INVENTOR(S) : Ralph Otto Keen

It is certified that error appears in the above-identified patent and that said Letters Patent are hereby corrected as shown below:

Column 4, line 3, after the words, "with a peripheral", insert a comma.

Column 4, line 3, after the words, "generally cylindrical", insert a comma.

Column 4, line 41, please delete the words, "position at a".

Column 4, line 51, after the words, "member 10 causes", please delete the word, "it", and insert therefor the words, ----the threaded bore----.

Column 4, line 56, after the words, "best shown in Figure 3", please insert a comma.

Column 5, line 12, after the words, "of the", please insert the words ----substantially parallel----.

Column 5, line 15, after the words, "groove 26 and the", please insert the word ----annular----.

Column 5, line 19, after the words, "and the opposite", please insert the word ----annular----.

Column 5, line 25, after the words, "of the", first occurrence, insert ----substantially parallel----.

UNITED STATES PATENT AND TRADEMARK OFFICE
CERTIFICATE OF CORRECTION

PATENT NO. : 4,086,946

DATED : May 2, 1978

INVENTOR(S) : Ralph Otto Keen

It is certified that error appears in the above-identified patent and that said Letters Patent are hereby corrected as shown below:

Column 5, line 28, before the word, "face", please insert the word ----annular----.

Column 5, line 43, after the words, "original position", please insert a comma.

Column 5, line 62, after the words, "from the", please insert the word ----annular----.

Column 5, line 65, after the words, "the threaded", please insert the word ----nut----.

Column 6, line 16, after the words, "between the", please insert the word, ----annular----. Same line, after the words, "of the lock", please insert the word, ----nut----.

Column 6, line 18, after the words, "of the lock", please insert the word ----nut----.

Column 6, line 57, after the words, "the opposite", please insert the words ----substantially parallel----.

UNITED STATES PATENT AND TRADEMARK OFFICE
CERTIFICATE OF CORRECTION

PATENT NO. : 4,086,946
DATED : May 2, 1978
INVENTOR(S) : Ralph Otto Keen

It is certified that error appears in the above–identified patent and that said Letters Patent are hereby corrected as shown below:

Column 8, line 4, after the words, "fully engaged", delete "n" and please insert the word ----in----.

Signed and Sealed this

Thirtieth Day of January 1979

[SEAL]

Attest:

RUTH C. MASON
*Attesting Officer*

DONALD W. BANNER
*Commissioner of Patents and Trademarks*